United States Patent [19]
Veligdan

[11] Patent Number: 6,147,787
[45] Date of Patent: Nov. 14, 2000

[54] LASER MICROPHONE

[75] Inventor: James T. Veligdan, Manorville, N.Y.

[73] Assignees: Brookhaven Science Associates; Brookhaven National Laboratory, both of Upton, N.Y.

[21] Appl. No.: 08/989,275

[22] Filed: Dec. 12, 1997

[51] Int. Cl.[7] ........................... H04B 10/00; H04B 10/08; H04B 10/30
[52] U.S. Cl. ............................................ 359/150; 359/151
[58] Field of Search ..................................... 359/151, 285, 359/290, 263, 279, 150; 455/605; 179/121 R, 121

[56] References Cited

U.S. PATENT DOCUMENTS

| | | | |
|---|---|---|---|
| 3,470,329 | 9/1969 | Young | 179/121 |
| 4,238,856 | 12/1980 | Bucaro et al. | 455/614 |
| 4,412,105 | 10/1983 | Muscatell | 179/121 R |
| 4,479,265 | 10/1984 | Muscatell | 455/605 |
| 5,262,884 | 11/1993 | Buchholz | 359/151 |
| 5,414,509 | 5/1995 | Veligdan | 356/349 |
| 5,910,855 | 6/1999 | Thomas | 359/285 |

FOREIGN PATENT DOCUMENTS

| | | |
|---|---|---|
| 125898 | 7/1983 | Japan . |
| 60-18100 | 1/1985 | Japan . |

OTHER PUBLICATIONS

Machine Design, "Optical Microphones Mix Light and Sounds," Dec. 12, 1994, p. 71.

*Primary Examiner*—Leslie Pascal
*Assistant Examiner*—Agustin Bello
*Attorney, Agent, or Firm*—Margaret C. Bogosian

[57] ABSTRACT

A microphone for detecting sound pressure waves includes a laser resonator having a laser gain material aligned coaxially between a pair of first and second mirrors for producing a laser beam. A reference cell is disposed between the laser material and one of the mirrors for transmitting a reference portion of the laser beam between the mirrors. A sensing cell is disposed between the laser material and one of the mirrors, and is laterally displaced from the reference cell for transmitting a signal portion of the laser beam, with the sensing cell being open for receiving the sound waves. A photodetector is disposed in optical communication with the first mirror for receiving the laser beam, and produces an acoustic signal therefrom for the sound waves.

12 Claims, 2 Drawing Sheets

LASER MICROPHONE

CROSS REFERENCE TO RELATED APPLICATION

The present application is related to concurrently filed patent application Ser. No. 08/989,350 entitled "Optical Microphone."

This invention was made with Government support under contract number DE-AC02-76CH00016, awarded by the U.S. Department of Energy. The Government has certain rights in the invention.

BACKGROUND OF THE INVENTION

The present invention relates generally to dynamic pressure or density measurement, and, more specifically, to microphones for detecting acoustic energy or sound.

A typical microphone is a transducer which converts acoustic energy into electrical energy. This is typically accomplished by allowing the acoustic energy to vibrate a diaphragm or membrane, with the vibration thereof being converted to an electrical signal indicative of the acoustic energy. However, the diaphragm inherently has mass which affects the ability of the microphone to accurately detect the original acoustic energy.

Various types of microphones are known which vary in sophistication and ability to accurately detect acoustic energy. Microphones are evaluated by various performance criteria including frequency range and response, dynamic range, sensitivity, and polar pattern or the directional response capability of the microphone.

Of particular interest is the microphone sensitivity which is typically expressed by the output voltage of the microphone for a particular sound pressure level. High microphone sensitivity is desired for discriminating against system noise and other electrical interference.

The polar pattern, or the directional response of the microphone is another important parameter to avoid the detection of unwanted sound or sources while linking the detection capability of the microphone to a specific direction.

Microphone diaphragms are typically made as thin and lightweight as possible to limit their adverse affect on accurately detecting variations in acoustic energy or sound. A low mass diaphragm is desirable for obtaining a flatter frequency response, and improved microphone sensitivity. However, such a diaphragm is subject to relatively large excursions in travel when exposed to a large pressure wave such as that occurring upon the pronunciation of "P" words. This causes undesirable popping response from a microphone when used for example in a public address speaker system. Accordingly, it is desired to provide a diaphragmless microphone for detecting acoustic energy without the typical problems associated with a diaphragm-microphone while obtaining good sensitivity, frequency range and response, and directional response, for example.

SUMMARY OF THE INVENTION

A microphone for detecting sound pressure waves includes a laser resonator having a laser gain material aligned coaxially between a pair of first and second mirrors for producing a laser beam. A reference cell is disposed between the laser material and one of the mirrors for transmitting a reference portion of the laser beam between the mirrors. A sensing cell is disposed between the laser material and one of the mirrors, and is laterally displaced from the reference cell for transmitting a signal portion of the laser beam, with the sensing cell being open for receiving the sound waves. A photodetector is disposed in optical communication with the first mirror for receiving the laser beam, and produces an acoustic signal therefrom for the sound waves.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
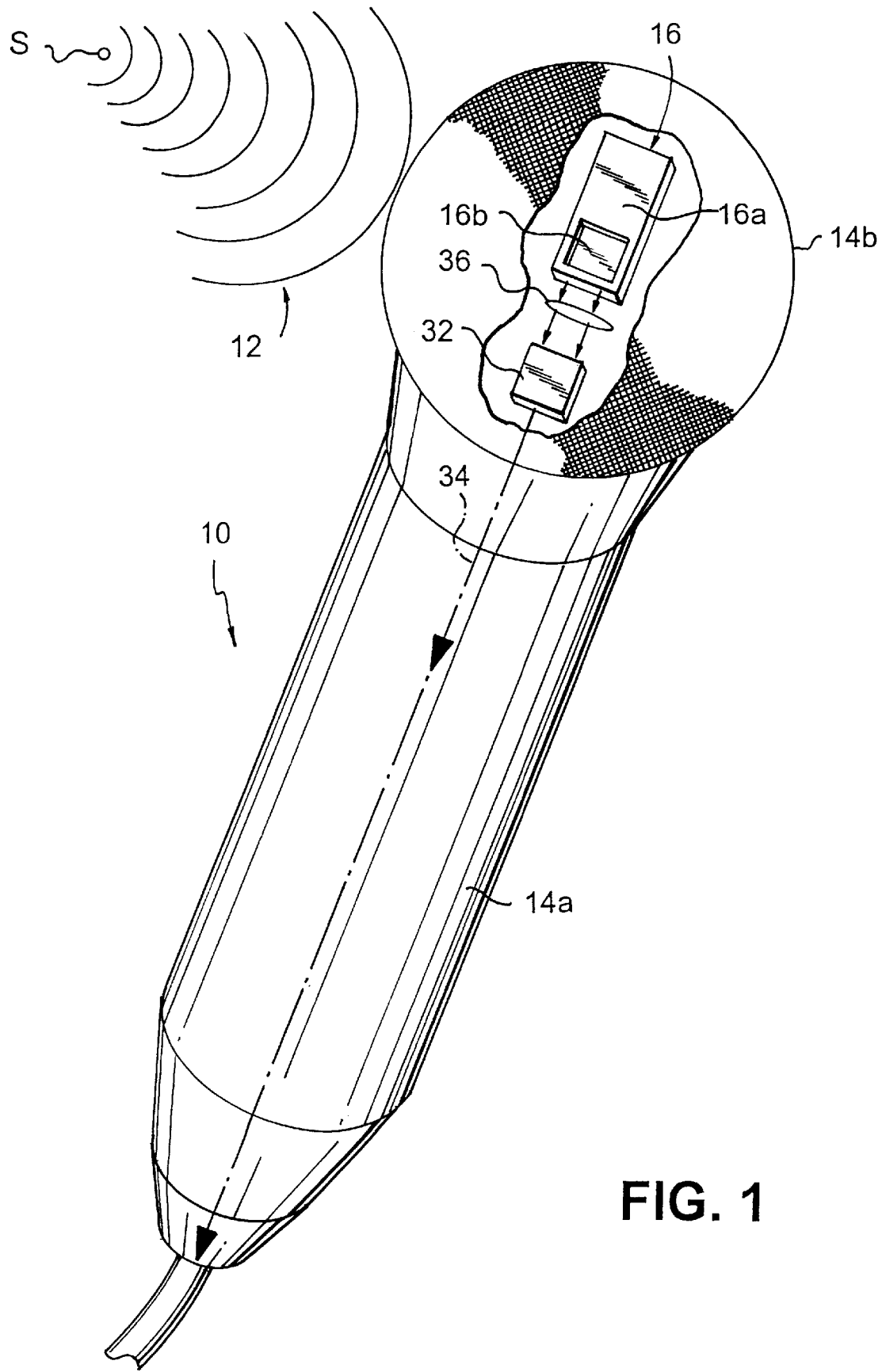
FIG. 1 is an isometric view of a laser microphone in accordance with an exemplary embodiment of the present invention including a laser resonator therein.

Illustrated schematically in FIG. 1 is a laser microphone 10 in accordance with an exemplary embodiment of the present invention for detecting sound pressure waves 12 from a suitable sound source S. The sound waves 12 may have any dynamic frequency, but are typically in the exemplary audible range of 20–20,000 hz. The microphone 10 is not limited to the audible range but is also capable of detecting acoustic energy below or above the audible range in unlimited acoustic bandwidth, except as limited by the electronic circuitry therefor.

The microphone 10 is configured in an exemplary embodiment with a tubular housing 14a for manually holding the microphone or mounting it in a suitable support. The microphone 10 also includes an optional acoustically transparent head 14b in which is suitably mounted means in the form of a laser oscillator or resonator 16 for directly optically detecting the sound waves 12, without using a moving mass diaphragm. The laser resonator 16 may take any conventional form and is modified in accordance with the present invention for performance in the laser microphone. The resonator 16 includes a suitable housing 16a having an inlet aperture 16b through which the sound waves 12 may enter.

Figure 2:
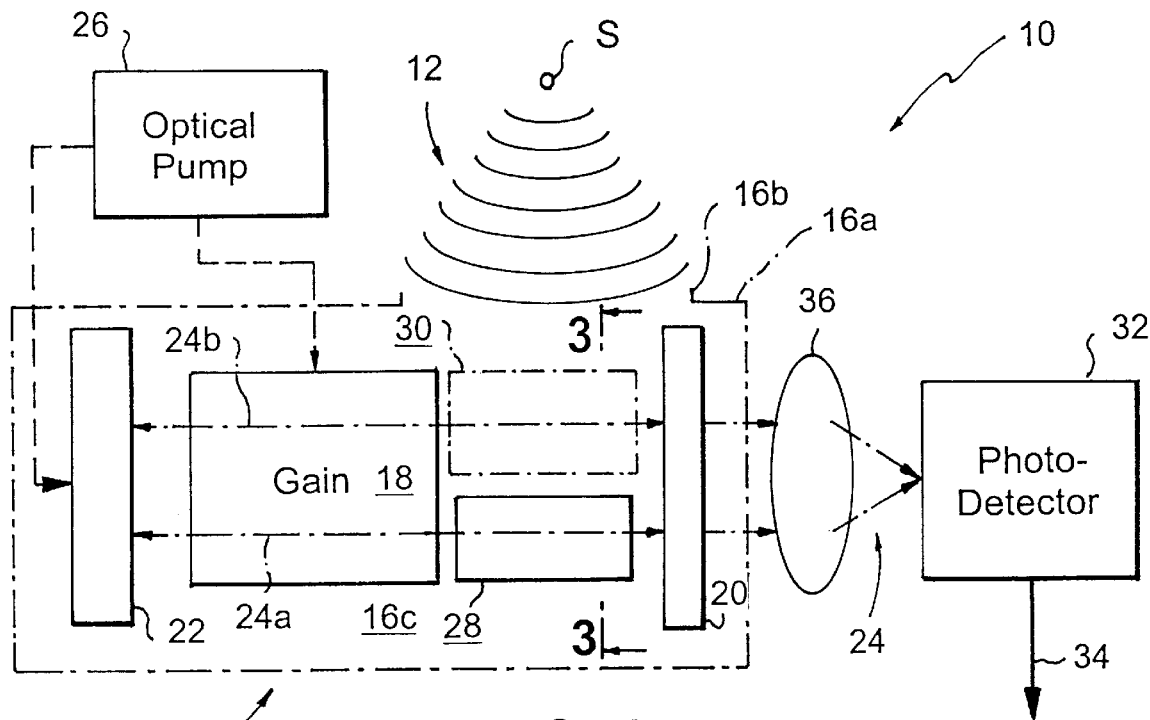
FIG. 2 is a schematic representation of the laser microphone illustrated in FIG. 1.

The laser microphone 10 is illustrated in more detail schematically in FIG. 2. The laser resonator 16 includes a lasing or laser gain material 18 aligned coaxially along its longitudinal axis between a pair of first and second end mirrors 20, 22 inside a resonator or pump cavity 16c. The laser material 18 may take any conventional form such as typical crystals, fibers, glasses, or gas. And, the first and second mirrors 20, 22 may take any conventional form, with the first mirror 20 being an output mirror, and the second mirror 22 being a rear mirror. The mirrors 20, 22 have suitable reflectivity for reflecting therebetween, and through the laser material 18, light energy for producing a laser beam 24 which is emitted from the resonator 16 through the partially reflective and transmissive output mirror 20.

Suitable means in the form of an optical pump 26 are provided for optically pumping the laser material 18 to produce the laser beam 24. The optical pump 26 may take any conventional form such as either an end pump introducing optical energy to the back side of the second mirror 22, or it may be a side pump introducing optical energy laterally into the laser material 18, with both being shown schematically in dashed line as alternatives. During conventional operation, the laser material 18 is pumped to generate light energy which is reflected between the mirrors 20, 22 with suitable energy for producing the laser beam 24. In accordance with the present invention, the laser resonator 16 is modified to provide the main sensing element for use in the laser microphone which directly detects the incident sound waves 12 without requiring a moving mass diaphragm.

More specifically, means in the form of a reference zone or cell 28 are disposed axially between one end of the laser material 18 and one of the end mirrors 20, 22 in optical alignment therebetween for transmitting or carrying a reference portion 24a of the developing laser beam 24 reflected between the mirrors 20,22 during pumping.

Correspondingly, a sensing zone or cell 30 is disposed axially between one end of the laser material 18 and one of the end mirrors 20, 22 in optical alignment therebetween. The sensing cell 30 is laterally displaced from the reference cell 28 for carrying or transmitting a signal portion 24b of the developing laser beam 24 inside the resonator 16. The sensing cell 30 is suitably open for also receiving the sound waves 12 through the resonator inlet 16b.

The reference cell 28 is optically transparent and acoustically isolated or shielded for allowing the reference portion 24a to reflect between the mirrors 20, 22 with little or no affect by the sound waves 12. The reference cell 28 may therefore take any suitable form such as an optically transparent hollow cell which is suitably evacuated.

The sensing cell 30 is also optically transparent for transmitting the signal portion 24b between the end mirrors 20,22, and is configured to receive the sound waves 12 which acoustically modulate the signal portion 24b inside the laser resonator 16 itself. In its simplest form, the sensing cell 30 is merely an empty zone defined between the laser material and one of the end mirrors 20,22 through which the sound waves 12 may pass.

The sound waves 12 in an air medium, for example, include compressed and rarefied waves of air. The compressed air has a higher density and therefore a higher refractive index. And, the rarefied waves have a lower density and lower refractive index. The signal portion 24b of the laser beam 24 in the laser resonator 16 is accordingly acoustically modulated by the sound waves 12 as they pass through it, with the light energy taking longer to travel through the compression waves as compared to the time required to pass through the rarefied waves. The instantaneous output of the laser resonator 16 will be Doppler shifted in frequency by an amount related to the acoustic frequency of the sound waves 12. Since the optical frequency of the laser beam 24 is many orders of magnitude greater than the audible frequency range, acoustic modulation of a conventional laser beam is minuscule, and undetectable. By heterodyning, it becomes readily detectable.

However, by utilizing the cooperating reference and sensing cells 28,30 inside the laser resonator 16 itself, acoustic modulation of only the signal portion 24b of the laser beam 24 is effected while the reference portion 24a remains unmodulated by the sound waves 12. The introduction of the reference and sensing cells 28,30 makes possible demodulation of the laser beam 24 for resolving an indication of the sound waves 12 from the signal portion 24b thereat.

More specifically, transducer means, in the form of a photodetector 32 with electrical-acoustic signal output, are disposed in optical alignment or communication with the output mirror 20 for receiving the laser beam 24, which includes both the reference and signal portions 24a,b. The photodetector 32 is effective for producing a resulting electrical acoustic signal 34 which is directly indicative of the detected sound waves 12. The photodetector 32 may take any conventional form, and may be configured in the form of a conventional photodiode for automatically heterodyning or demodulating the reference and signal portions 24a,b of the laser beam 24 to produce the acoustic signal 34.

In heterodyning, the frequencies of the reference and signal portions 24a,b are combined together to provide sum and difference or beat frequency therebetween which is directly indicative of the sound waves 12. The sum frequencies in hundreds of terahertz are too high to measure. The difference frequency is the acoustic signal, and is readily detectable. Without the sound source 12 emitting the sound waves 12, the respective frequencies of the reference and signal portion 24a,b of the laser beam 24 are substantially identical and no beat frequency results. However, the interaction of the sound waves 12 with the signal portion 24b of the laser beam 24 inside the laser resonator 16 modulates that portion and produces a corresponding beat frequency when resolved using heterodyning which is automatically effected by the photodiode detector 32.

The reference and sensing cells 28, 30 may be disposed in various configurations in the laser resonator 16. In the exemplary embodiment illustrated in FIG. 2, the sensing cell 30 laterally adjoins the reference cell 28 between the laser material 18 and a common one of the mirrors, e.g. the output mirror 20. This configuration of the reference and sensing cell 28, 30 is effective for separating the reference and signal portions 24a,b of the laser beam 24 inside the laser resonator 16 for modulation only of the signal portion 24b by direct interaction of the sound waves 12.

Since the separated reference and signal portions 24a,b of the laser beam 24 are laterally spaced apart in the resonator, a focusing lens 36 is preferably disposed in optical alignment between the output mirror 20 and the photodetector 32 for mixing and focusing together the two portions of the laser beam 24 onto the photodetector 32. The photodetector 32 automatically effects heterodyning by the sum and difference frequencies of the resulting laser beam 24 producing the electrical acoustic signal 34 which directly corresponds with the detected sound waves 12.

As indicated above, a significant advantage of the laser microphone 10 is the detection of the sound waves 12 without the need for a moving mass diaphragm. This correspondingly eliminates the adverse effects of the diaphragm. Improved frequency response, dynamic range, and unlimited bandwidth are obtained. The objectionable popping "P" sound is also eliminated. And, the laser microphone 10 has enhanced sensitivity. The sensitivity of the laser microphone is directly affected by the number of reflections of the developing laser beam between the two end mirrors 20, 22. By incorporating the sensing cell 30 directly in the resonator cavity 16c, the large number of reflections of the developing laser beam is able to probe the sound waves 12 with maximum sensitivity.

Figure 3:
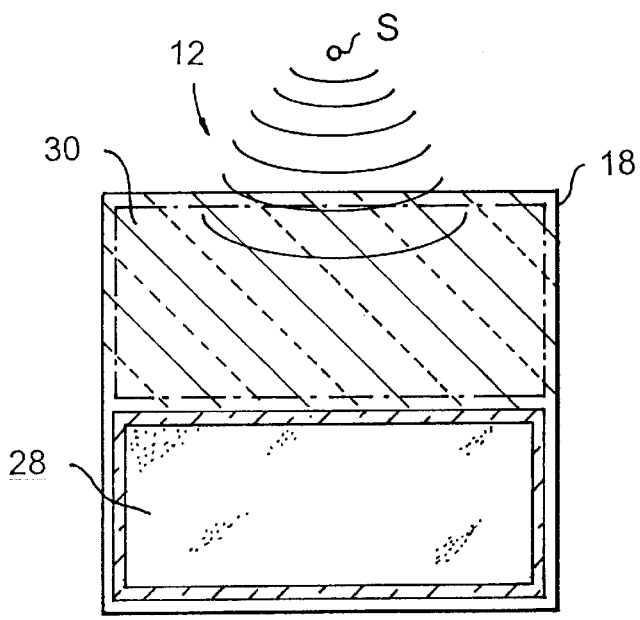
FIG. 3 is an elevational sectional view through the laser resonator illustrated in FIG. 2 and taken along line 3—3.

An additional advantage of the preferred configuration of the adjoining reference and sensing cell 28, 30 illustrated in FIG. 2, and in more detail in FIG. 3, is the resulting directional capability of the laser microphone 10. In microphone design, it is desirable in many applications to limit directional sensitivity to specific sound sources such as the source S. Since the reference cell 28 blocks one side of the sensing cell 30, the sound waves 12 are limited to modulating the signal portion 24b on primarily one side only of the laser resonator 16. In this way, directional sensitivity of the microphone 10 is limited in angular extent.

Furthermore, the sensing cell 30 illustrated in FIG. 3 is preferably planar in the form of a rectangle for directionally receiving the sound waves 12 primarily perpendicular to the one exposed large side thereof. Since the laser material 18 may have any suitable configuration including cylindrical, square, and rectangular, for example, the corresponding configurations of the reference and sensing cells 28, 30 may also vary as desired. Directional sensitivity of the sensing cell 30 may be increased by decreasing the effective thickness of the sensing cell 30 for propagating the signal portion 24b of the laser beam as a sheet of light in primarily one plane only.

The laser microphone 10 disclosed above in an exemplary configuration has substantial advantages over conventional diaphragm-based microphones. In particular, sound waves 12 are directly detected inside the laser resonator 16 itself. The optical gain of the lasing material 18 therefore also provides corresponding acoustic gain for the detected sound waves 12. Substantial sensitivity is also obtained by the oscillating laser beam inside the resonator 16 for accurately detecting sound waves 12 over a substantially unlimited bandwidth including the audible frequency range as well as below and above that range. Since the photodetector 32 automatically provides heterodyning of the laser beam 24 for demodulating the lower frequency of the sound waves 12 from the higher frequency laser beam, a relatively simple assembly is created, which may be readily manufactured in various forms as desired.

The preferred embodiment illustrated in FIGS. 2 and 3 also enjoys directional sensitivity due to the offset displacement between the cells 28,30. In an alternate embodiment (not shown), omni-directional sensitivity may be obtained; for example by positioning the reference cell coaxially and concentrically within the surrounding sensing cell, both having annular configurations.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A microphone for detecting sound pressure waves comprising:

a laser resonator including a laser gain material aligned coaxially between a pair of first and second mirrors for producing a laser beam;

a reference cell disposed between said laser material and one of said mirrors for transmitting a reference portion of said laser beam between said mirrors;

a sensing cell disposed between said laser material and one of said mirrors, and laterally displaced from said reference cell for transmitting a signal portion of said laser beam, with said sensing cell being open for receiving said sound waves; and a photodetector disposed in optical communication with one of said mirrors for receiving said laser beam including both said reference and signal portions and producing an acoustic signal therefrom for said sound waves.

2. A microphone according to claim 1 wherein:

said reference cell is optically transparent and acoustically isolated; and said sensing cell is optically transparent for transmitting said signal portion through said sound waves for acoustic modulation thereof.

3. A microphone according to claim 2 wherein said photodetector is configured for heterodyning said reference and signal portions of said laser beam to produce said acoustic signal.

4. A microphone according to claim 3 further comprising a focusing lens disposed between said first mirror and said photodetector for focusing said laser beam thereon.

5. A microphone according to claim 3 wherein:

said first mirror is an output mirror disposed between one end of said laser material and said photodetector;

said second mirror is a rear mirror disposed adjacent to an opposite end of said laser material; and said reference and sensing cells are disposed adjacent said output mirror.

6. A microphone according to claim 3 wherein said sensing cell laterally adjoins said reference cell between said laser material and a common one of said mirrors.

7. A microphone according to claim 3 wherein said sensing cell is planar for directionally receiving said sound waves.

8. A microphone according to claim 3 wherein said reference cell is hollow and evacuated.

9. A method of optically detecting sound pressure waves without a moving mass diaphragm comprising:

optically pumping a laser gain material in a laser resonator to produce a laser beam;

modulating in said laser resonator a first portion of said laser beam with said sound waves; and heterodyning a second portion of said laser beam with said modulated first portion to produce an acoustic signal for said sound waves.

10. A method according to claim 9 further comprising separating said first and second portions of said laser beam inside said laser resonator for modulation only of said first portion by direct interaction of said sound waves.

11. A method according to claim 10 further comprising limiting directional sensitivity of said modulated first portion to primarily one side only of said laser resonator.

12. A method according to claim 10 further comprising acoustically isolating said laser beam second portion from said sound pressure waves.

* * * * *